(12) United States Patent
Narayanaswami

(10) Patent No.: US 9,323,439 B2
(45) Date of Patent: Apr. 26, 2016

(54) SYSTEM AND METHOD FOR DISPLAYING PUBLISHED ELECTRONIC DOCUMENTS

(75) Inventor: Chandrasekhar Narayanaswami, Wilton, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1643 days.

(21) Appl. No.: 12/058,361

(22) Filed: Mar. 28, 2008

(65) Prior Publication Data

US 2009/0249217 A1   Oct. 1, 2009

(51) Int. Cl.
*G06F 3/048* (2013.01)
*G06F 3/0485* (2013.01)
*G06F 17/30* (2006.01)
*G06F 17/24* (2006.01)

(52) U.S. Cl.
CPC ........ *G06F 3/0485* (2013.01); *G06F 17/30716* (2013.01); *G06F 17/241* (2013.01); *G06F 2203/04806* (2013.01)

(58) Field of Classification Search
CPC .................................................... G06F 3/048
USPC ................................. 715/744, 800
See application file for complete search history.

(56) References Cited

U.S. PATENT DOCUMENTS

| | | | |
|---|---|---|---|
| 6,240,410 B1 | 5/2001 | Wical | |
| 2004/0201633 A1* | 10/2004 | Barsness et al. | 345/864 |
| 2005/0033657 A1* | 2/2005 | Herrington et al. | 705/26 |
| 2006/0184540 A1* | 8/2006 | Kung et al. | 707/10 |
| 2007/0055926 A1* | 3/2007 | Christiansen et al. | 715/512 |
| 2007/0198476 A1* | 8/2007 | Farago et al. | 707/3 |
| 2008/0109762 A1* | 5/2008 | Hundal et al. | 715/855 |

* cited by examiner

*Primary Examiner* — Tadeese Hailu
*Assistant Examiner* — Darrin Hope
(74) *Attorney, Agent, or Firm* — Nidhi Garg, Esq.; McGinn IP Law Group, PLLC.

(57) ABSTRACT

A system and method that displays published electronic documents including an electronic periodical database that stores electronic files representing a plurality of electronic documents and a plurality of corresponding published issues to each of the plurality of electronic documents, a electronic periodical display controller that displays a graphic substrate upon which the electronic documents and corresponding published issues are arranged, a user input controller that receives user input to manipulate the graphic substrate to control a zooming function and a panning function, and associates input user information with a specific one of the plurality of electronic published issues, and a user input database that saves the input user information associated with the specific electronic published issue, and displays the stored input user information within the graphic substrate associated with the specific one of the plurality of electronic published issues of the plurality of electronic documents.

25 Claims, 10 Drawing Sheets

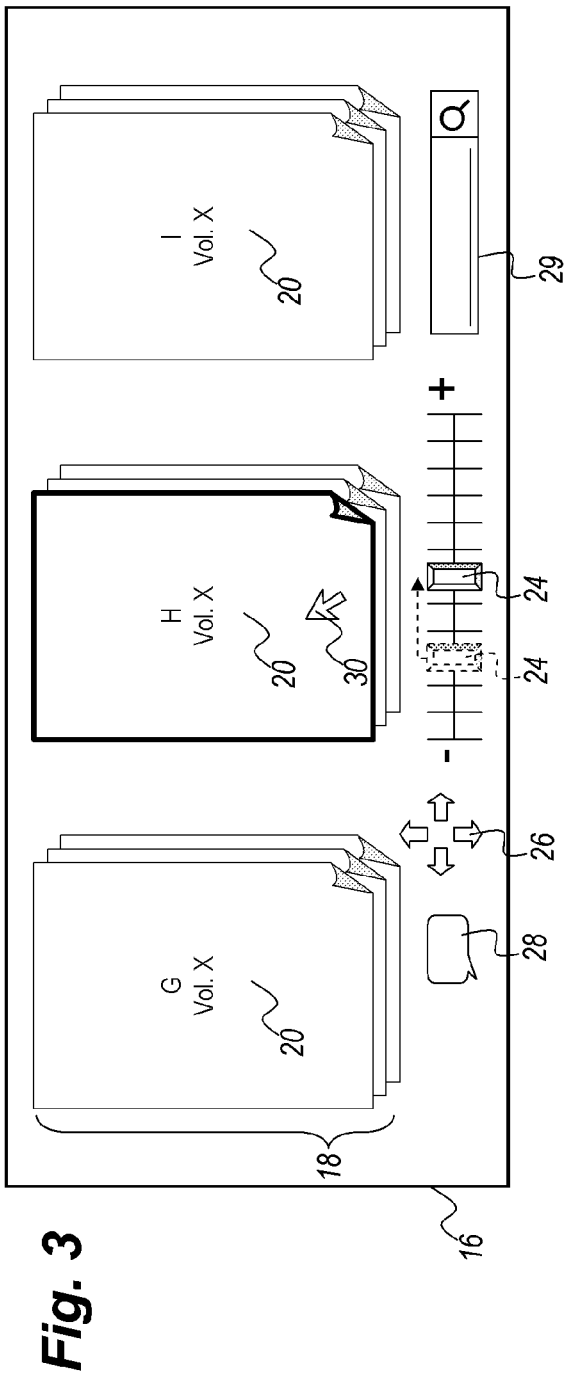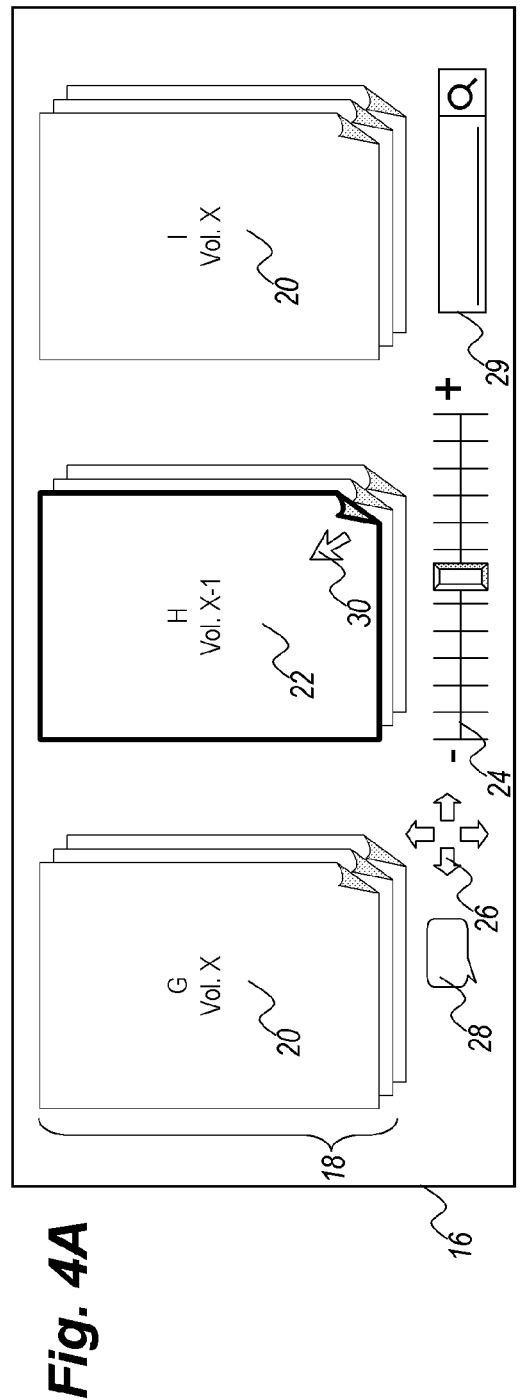

SYSTEM AND METHOD FOR DISPLAYING PUBLISHED ELECTRONIC DOCUMENTS

BACKGROUND OF THE INVENTION

1. Field of the Invention

The present invention generally relates to a system and method for displaying published electronic documents on a scalable tiled graphic composite document rendering that arranges the electronic documents for display based on predetermined configurations and user input display manipulations. Users may also input information associated with a particular electronic document publication for display to other users or to a selected group of users.

2. Description of the Related Art

The World Wide Web has made access to online publications of printed documents much easier via web browser interfaces that display an electronic document publication in hypertext markup language (HTML), in a graphic image file format, combination of both, or other multi-media formats. Typically, a user navigates to a specific publication's web site to view the contents of the latest issue of that publisher's publication. Usually a publisher will provide access for users to view back issues of the publication through an archival portal or database.

However, a user has not been able to view a number of publications from different publishers in a single displayed view, to simultaneously search a number publications from different publishers and retrieve those results in a single displayed view, to manipulate a graphical substrate that displays a mashup of multimedia files corresponding to a number of different electronic document publications and past issues of those electronic document publications, and enable users to leave text annotations and ratings with respect to an electronic document publication, the specific issue of an electronic document publication or a specific location within a specific issue of an electronic document publication.

SUMMARY OF THE INVENTION

In view of the foregoing and other exemplary problems, drawbacks, and disadvantages of the conventional methods and structures, a purpose of the exemplary aspects of the present invention is to provide a system and method for displaying a number of published electronic documents and periodicals, and their corresponding published or corresponding issues on a graphic substrate that can be manipulated by a user.

An exemplary aspect of the present invention includes a system that displays published electronic documents including an electronic periodical database that stores electronic files representing a plurality of electronic documents and a plurality of corresponding published issues to each of the plurality of electronic documents, a electronic periodical display controller that displays a graphic substrate upon which the plurality of electronic documents and the plurality of corresponding published issues retrieved from the electronic periodical database are arranged, and a user input controller that receives user input to manipulate the graphic substrate to control a zooming function and a panning function that displays the plurality of electronic documents and published issues within the graphic substrate, and associates input user information with a specific one of the plurality of electronic published issues of the plurality of electronic documents.

Another exemplary aspect of the present invention includes wherein the arranged electronic documents displayed within the graphic substrate are arranged by at least one from the group including a general topic of each of the electronic documents, user subscription information to a periodical, a user's organization, and a predetermined arrangement configuration.

Another exemplary aspect of the present invention includes wherein the electronic documents and corresponding published issues are electronic files of at least one from the group including digitized image files, digital document files, animated graphic files, application program files, audio files, video files, and composite multimedia files.

Another exemplary aspect of the present invention includes wherein the user input controller receives a user selection function applied to a specific issue of the plurality of corresponding published issues of the plurality of electronic documents that causes a display of additional information of the specific issue.

Another exemplary aspect of the present invention includes wherein the display of additional information includes at least one from the group including displaying a higher resolution document rendering of the specific issue, displaying a table of contents of the specific issue, and displaying previously un-displayed content of the specific issue.

Another exemplary aspect of the present invention includes wherein the user input controller receives a user selection function applied to an electronic periodical that causes a display of a previously un-displayed corresponding published issue.

Another exemplary aspect of the present invention includes a user input database that saves the input user information from the user input controller associated with the specific one of the plurality of electronic published issues of the plurality of electronic documents, and displays on the graphic substrate the stored input user information within the graphic substrate associated with the specific one of the plurality of electronic published issues of the plurality of electronic documents.

Another exemplary aspect of the present invention includes wherein the display of additionally information includes at least one from the group including displaying a higher resolution document rendering of the corresponding published issue, displaying a table of contents of the corresponding published issue, and displaying previously un-displayed content of the corresponding published issue.

Another exemplary aspect of the present invention includes wherein the panning function applied to the graphic substrate causes a display of additional electronic documents and corresponding published issues previously un-displayed in the graphic substrate.

Another exemplary aspect of the present invention includes wherein the zooming function applied to the graphic substrate one of displays one of additional electronic documents and corresponding published issues previously un-displayed in the graphic substrate, and removes from displaying some of the plurality of electronic documents and the plurality of corresponding published issues previously displayed in the graphic substrate.

Another exemplary aspect of the present invention includes wherein the user information includes one from the group including a date and time indicator, a text message, an indication of an originating author, an indication of one of a reviewer and a reviewer text message, a rating indication, an authorized reviewing group designation.

Another exemplary aspect of the present invention includes wherein the user information is displayed within the graphic substrate and associated with the specific one of the plurality of electronic published issues of the plurality of electronic documents.

Another exemplary aspect of the present invention includes wherein the user information is displayed within the graphic substrate and associated with one of a specific location and a specific feature within the specific one of the plurality of electronic published issues of the plurality of electronic documents.

Another exemplary aspect of the present invention includes wherein the user information is displayed based on the authorized reviewing group designation that limits the display of the user information to non-designated users.

Another exemplary aspect of the present invention includes further including a publication issue selection function that responds to the user input by displaying in the graphic substrate all of the displayed plurality of corresponding published issues corresponding to a same user selected publication time period.

Another exemplary aspect of the present invention includes wherein the graphic substrate further includes a scalable graphic tiled composite document rendering that displays information output from the electronic periodical display controller corresponding to the plurality of electronic documents and the plurality of corresponding published issues based on a value of the zooming function and value of the panning function.

Another exemplary aspect of the present invention includes wherein the electronic periodical database, the electronic periodical display controller, and the user input database is remotely disposed from a location where a user inputs the user input.

Another exemplary aspect of the present invention includes a system for displaying published electronic documents including a electronic periodical display controller that displays a graphic substrate upon which a plurality of electronic documents and a plurality of corresponding published issues to each of the plurality of electronic documents are arranged, and a user input controller that receives user input to manipulate the graphic substrate to control a zooming function and a panning function that displays the plurality of electronic documents and published issues within the graphic substrate, and associates input user information with a specific one of the plurality of electronic published issues of the plurality of electronic documents.

Another exemplary aspect of the present invention includes an electronic periodical database that stores electronic files representing the plurality of electronic documents and the plurality of corresponding published issues to each of the plurality of electronic documents.

Another exemplary aspect of the present invention includes a user input database that saves the input user information from the user input controller associated with the specific one of the plurality of electronic published issues of the plurality of electronic documents, and displays on the graphic substrate the stored input user information within the graphic substrate associated with the specific one of the plurality of electronic published issues of the plurality of electronic documents.

Another exemplary aspect of the present invention includes displaying a scalable graphic tiled graphic substrate upon which a plurality of electronic documents and a plurality of corresponding published issues to each of the plurality of electronic documents are arranged, and controlling the graphic substrate to manipulate the display of the plurality of electronic documents and published issues by a zooming function, a panning function and a selection function.

Another exemplary aspect of the present invention includes inputting user information to be associated with a specific one of the plurality of electronic published issues of the plurality of electronic documents, storing the user information in a user input database, displaying the stored user input within the graphic substrate associated with the specific one of the plurality of electronic published issues of the plurality of electronic documents on the graphic substrate.

Another exemplary aspect of the present invention includes wherein the displaying further includes displaying a composite document rendering that displays information regarding the plurality of electronic documents and the plurality of corresponding published issues corresponding to a value of the zooming function and value of the panning function.

Another exemplary aspect of the present invention includes receiving user input from a remotely disposed location used for the controlling the graphic substrate to manipulate the display of the plurality of electronic documents and published issues.

Another exemplary aspect of the present invention includes a programmable storage medium tangibly embodying a program of machine-readable instructions executable by a digital processing apparatus to perform operations supporting a method of displaying published electronic documents, the operations including displaying a scalable tiled graphic substrate upon which a plurality of electronic documents and a plurality of corresponding published issues to each of the plurality of electronic documents are arranged, and controlling the graphic substrate to manipulate the display of the plurality of electronic documents and published issues by a zooming function, a panning function and a selection function, receiving input to manipulate the graphic substrate display of the plurality of electronic documents and published issues by a zooming function, a panning function and a selection function, inputting user information to be associated with a specific one of the plurality of electronic published issues of the plurality of electronic documents, storing the user information in a user input database, and displaying the stored user input within the graphic substrate associated with the specific one of the plurality of electronic published issues of the plurality of electronic documents on the graphic substrate.

With its unique and novel features, the present invention provides a method and system for requesting help which may eliminate the need for a help-desk person, and may, therefore, provide significant cost savings to an organization.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 3 illustrates an exemplary embodiment of the system that displays published electronic documents having a zooming function applied to the display, according to an exemplary aspect of the present invention;

FIG. 4A illustrates an exemplary embodiment of the system that displays published electronic documents further illustrating a zooming function to display a previous published electronic documents according to an exemplary aspect of the present invention;

DETAILED DESCRIPTION OF EXEMPLARY EMBODIMENTS OF THE INVENTION

Figure 1:
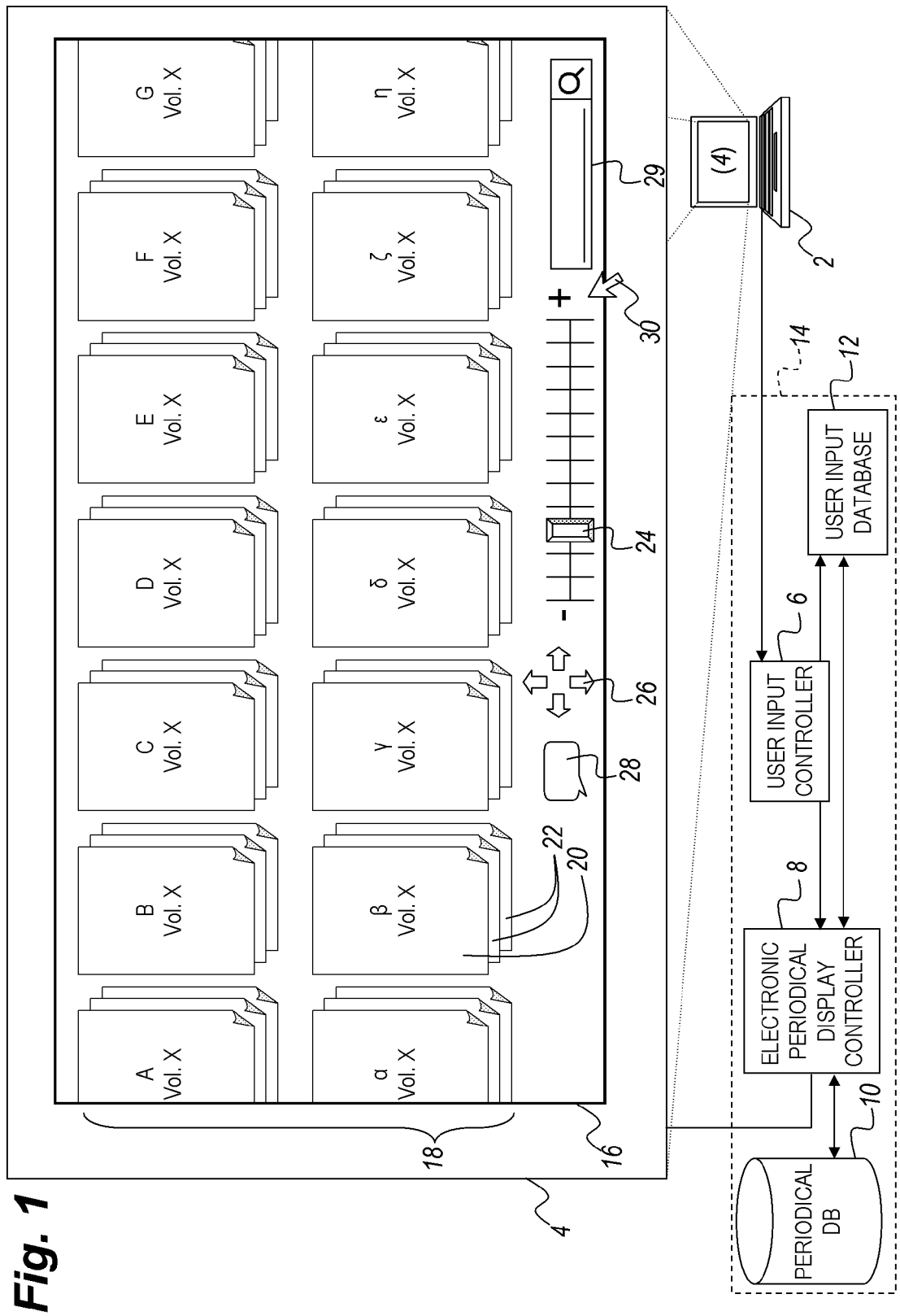
FIG. 1 illustrates an exemplary embodiment of the system that displays published electronic documents, according to an exemplary aspect of the present invention.

Applicant refers to electronic document publications in this disclosure of the invention as being either electronic renderings of periodical publications and documents typically intended for printed distribution, and publications or documents that are distributed completely within the electronic or digital realm. These electronic document publications may include electronic files of any one or a combination of scanned image files, (e.g., bitmap, tagged image file (TIF), Joint Photographic Experts Group (JPEG) files, etc.), digital document files, (e.g., Portable Document File (PDF), etc.), animated graphic files, (e.g., Graphic Interchange Format (GIF) files, Flash™ files, etc.), specific application files, (e.g., MS Word™, format files, WordPerfect™ format files, etc.), embedded video (Moving Picture Experts Group (MPEG-4) files, etc.), or embedded audio (MPEG-1 Audio Layer 3 (MP3) files, WAV files, etc.).

Each electronic document publication generally includes a cover page, a Table of Contents page, and content which may include articles and advertisements. The electronic document publications resemble their counterpart print distributed publications in structure by having discrete pages for the cover page, table of contents, and any articles or advertisements, wherein the electronic document publication first displays the cover page when first viewed by a user within the display system of the present invention just as a customer would find it at a newsstand or a magazine rack in a retail store.

Referring now to the drawings, and more particularly to FIGS. 1-9, there are shown exemplary embodiments of the method and structures of the present invention.

FIG. 1 generally illustrates a system for displaying published electronic documents. A user input device 2, that may include a computer or user terminal, includes a display 4 and input devices such as a keyboard and a pointing device such as the mouse, touchpad, electronic stylus or similar coordinate input devices. User input device 2 communicates user input with a user input controller 6 remotely disposed from the user input device 2. The user input controller 6 communicates the user input to an electronic periodical display controller 8 that retrieves published electronic documents from a periodical database 10 that may be displayed on the display 4 of the user input device 2 or on an alternate display device (not shown).

The user input controller 6 additionally communicates and causes to store the user input in a user input database 12. The user input stored in the user input database 12 may include text annotations and user ratings to be included with the display of an electronic document publication, a specific issue of an electronic document publication, or a specific location within an electronic document publication. This stored user input is then referenced to specific electronic document publications in the periodical database 10 and to specific portions or locations of the electronic document publications in the periodical database 10 such that when a specific periodical is displayed on the display 4, the electronic periodical display controller 8 retrieves the previously stored user input from the user input database 12 and simultaneously displays the user input with the electronic document publication or at a specified location within the electronic document publication.

User input controller 6, electronic periodical display controller 8, periodical database 10, and user input database 12 may be remotely disposed from the user input device 2 and/or the display 4 designated by the dashed box 14 in FIG. 1. An example may include a user input device computer 2 communicating via a network to a remotely disposed server 14 that includes the electronic periodical display controller 8, the user input controller 6, the user input database 12, and periodical database 10. The electronic periodical display controller 8 may retrieve user information stored in the user input database 12 and electronic document publication data from the periodical database 10 to generate a display on the user input device computer 2. Additionally, the electronic periodical display controller 8, the user input controller 6 or the user input database 12 may reside locally on a computer having a user input device 2 and a display 4 as a computer program executed by the computer's processor that retrieves information from a periodical database 10 at a remote location to generate a graphical substrate 16 on the display 4 that displays the retrieved electronic documents.

Electronic periodical display controller 8 generates a graphical substrate 16 that is a scalable tiled graphic composite document rendering upon which a number of electronic documents 18 are displayed. Graphical substrate 16 may be an application within a web browser, or may be a standalone program apart from any web browser. In addition, the graphical substrate 16 may include an application programming interface (API) that allows a graphic substrate to be navigated and manipulated by a user, causes the input and display of user information, and enables query and search functions. The electronic documents 18, (illustrated in FIG. 1 as a first row of electronic document publications A, Vol. X to G, Vol. X, and as a second row of electronic document publications α, Vol. X, to η, Vol. X, where volume "X" represents the most current issue of the publication), are displayed on a double row format which displays the electronic document publications in both a horizontal and vertical direction.

The graphical substrate 16 is considered like a graphical electronic "canvas" that only displays the electronic document publications 18 determined by the electronic periodical display controller 8 and retrieves a limited number of electronic document publication user graphic files outside of the field of view or the visible boundary of the graphical substrate 16, and so that during a user panning or zooming function, the display of the electronic documents may update quickly with electronic document publications previously out of view in the display but corresponding to a proximate position with respect to the displayed electronic document publications 18.

Electronic document publications displayed on the graphical substrate 16 may include low resolution document images when a large number of electronic document publications are displayed within the graphical substrate 16 to facilitate quick retrieval and display of documents from periodical database 10. As more detail is requested by the user of particular publications, higher resolution files are retrieved from the periodical database 10 for display within the graphical substrate 16. Additionally, graphical substrate 16 may include hypertext markup language (HTML) code in combination with the multimedia file types, for example, JavaScript™, Flash™, and Silverlight™ applications.

The electronic periodical display controller 8 may be programmed to limit the retrieval and display of certain high resolution files requested by users to encourage users to pay a subscription fee for the display of those requested high resolution files or to subscribe to that particular publication for full access to all high resolution files of that particular electronic document publication.

The current electronic document publication 20, (for example, illustrated in FIG. 1 as a publication, "β", Vol. X), is displayed with its cover page and a graphic representations of previous electronic published documents 22 displayed in a stackable thumbnail format under the cover page 20. These initial document renderings of the current electronic periodical 20 and previous electronic documents 22 are lower resolution graphic document renderings or files displayed in the graphical substrate 16. Each of these display graphic document renderings or files are retrieved by the electronic periodical display controller 8 from the periodical database 10.

The graphical substrate 16 further includes a user-controlled zooming feature illustrated for example by the zoom slider 24 wherein a user can change the field of view within the graphical substrate 16 of the displayed electronic documents 18. Additionally, the graphical substrate 16 further includes a user-controlled panning feature illustrated for example by the panning control 26 wherein a user can scroll the graphical substrate 16 to display additional electronic documents not previously displayed in the graphical substrate 16. Additionally, the user may "grab" the graphical substrate 16 with an input device to drag the graphical substrate 16 in a vertical and/or a horizontal direction.

Graphical substrate 16 further includes a user-controlled tag editor 28 so the user is able to insert comments and/or rating information on a specific electronic document publication, a specific issue of electronic document publication, or at a specific location with an electronic document publication. Graphical substrate 16 further includes a search feature 29 wherein a user may enter a string of text to be searched within a specific electronic document publication, a group of electronic document publications or a specific category of electronic document publications.

User input device 2 includes a coordinate input or pointing device, as mentioned above, that may correspond to a graphically displayed cursor 30, as shown in FIG. 1, for selecting electronic document publications and manipulating the display of the electronic document publications in graphical substrate 16.

Figure 2:
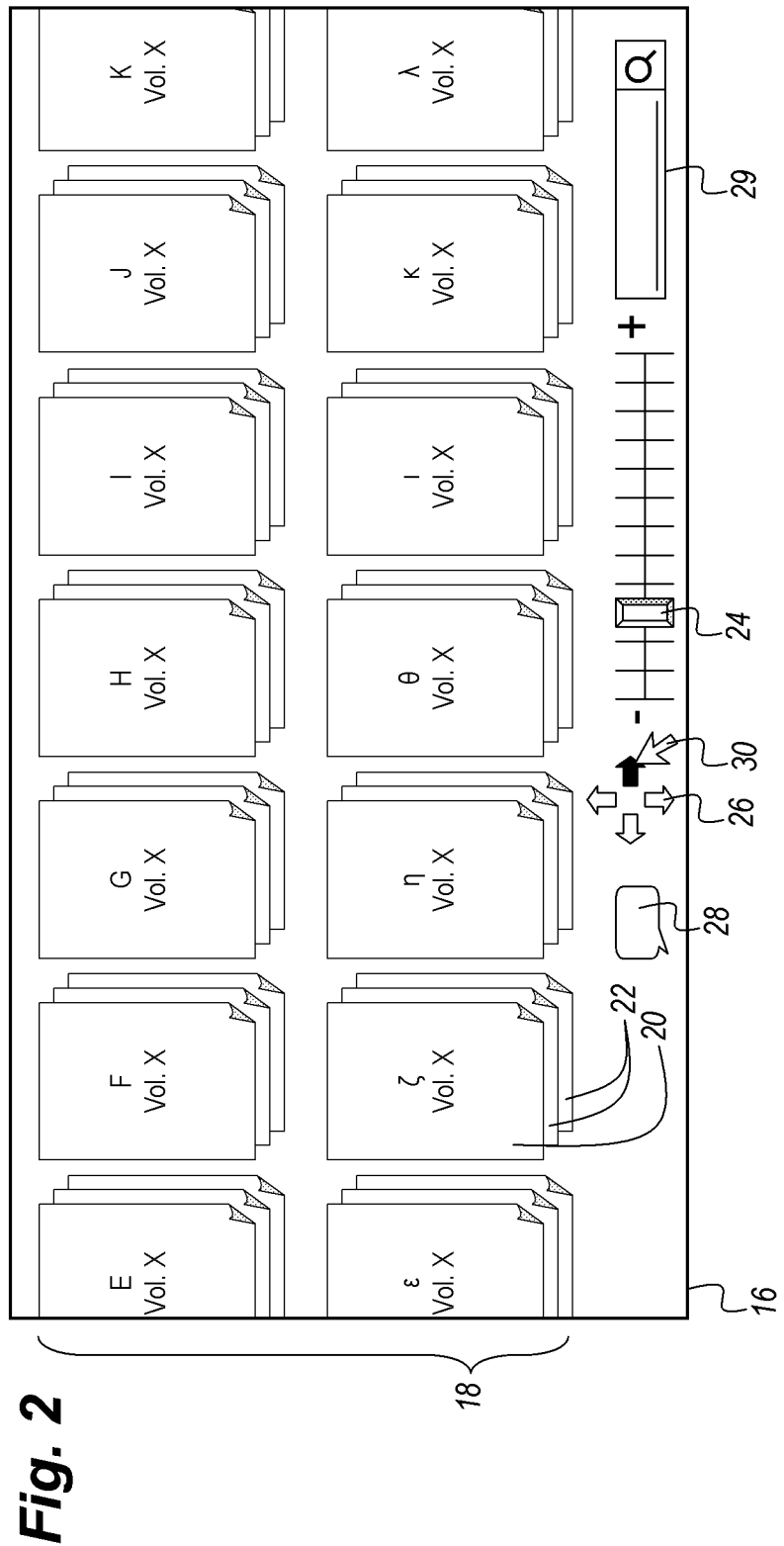
FIG. 2 illustrates an exemplary embodiment of the system that displays published electronic documents having a scrolling function applied to the display, according to an exemplary aspect of the present invention.

FIG. 2 illustrates an embodiment of the present invention where the user input device 2 controls a panning function of electronic document publications 18 in the graphical substrate 16. This panning feature may be controlled by a pointing device on the user input device 2 that controls cursor 30 to select a panning direction of the panning function control 26, or predetermined keys on a keyboard of the user input device 2, (for example, arrow, page-up or page-down keys). FIG. 2 illustrates cursor 30 selecting a right direction panning function that scrolls the electronic document publications 18 in a leftward direction. As mentioned previously, the user may also "grab" the graphical substrate "canvas" to drag it in any direction to change the field of view. A touch screen input device may also be used to enable a user to pinch, zoom and manipulate the graphical substrate 16 as well as a mouse input device that enables a user to drag a cursor over the graphical substrate 16.

FIG. 3 illustrates embodiment of the present invention where the user input device two controls a zooming function of electronic document publications 18 in the graphical substrate 16. This zooming feature may be controlled by a pointing device on the user input device 2 that controls cursor 30 to select a zooming factor of the zooming function control 24, or predetermined keys or inputs on the user input device 2, (for example, a scroll wheel on a coordinate input mouse). FIG. 3 illustrates a zooming slider being moved in the right direction from a first to a second position that zooms in to effectively reduce the number of electronic document publications displayed in the graphical substrate 16. For example, the displayed electronic document publications after zooming function as applied to the graphical substrate 16 only display publication G, Vol. X, to publication I, Vol. X.

Figure 4B:
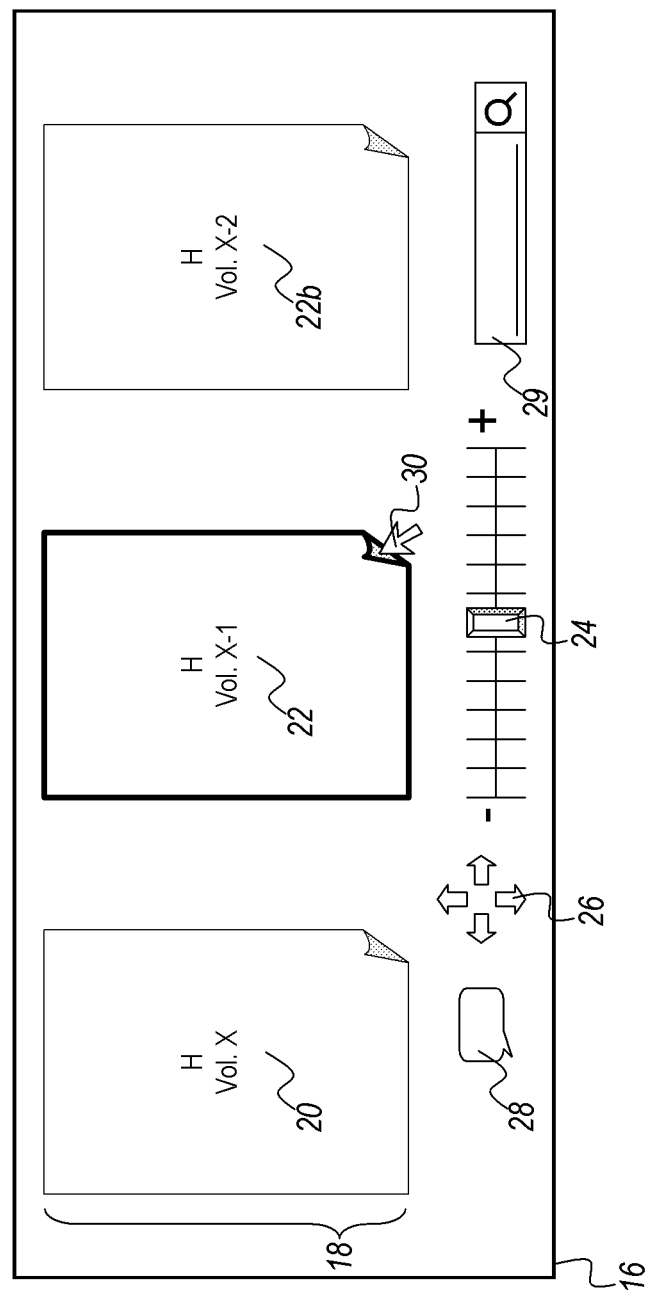
FIG. 4B illustrates an exemplary embodiment of the system that displays published electronic documents further illustrating an alternate zooming function to display previous published electronic documents, according to an exemplary aspect of the present invention.

The following FIGS. 4A and 4B illustrate two alternative display outcomes from a further zooming function as shown being selected in FIG. 3. For example, FIG. 3 illustrates cursor 30 selecting, (designated by the bolded outline of publication "H"), to further zoom in on, i.e., retrieve additional information from publication "H."

FIG. 4A illustrates a first display option after selecting publication "H" from FIG. 3, wherein the previous electronic document publication issue 22, (Vol. X−1), is displayed on top of the electronic document publications for further review. The previously displayed most current issue, Vol. X, for example, may cycle to the back of the "stack" of electronic document publications.

FIG. 4B illustrates a second display option after selecting publication "H" from FIG. 3, wherein the previous electronic document publication issue 22, (Vol. X−1), is displayed in the center of the graphical substrate 16 for further review, while the most current electronic document publication issue 20, (Vol. X), is displayed to the left, and the next previous electronic document publication issue 22b, (Vol. X−2), is displayed to the right. This display may be considered an "unstacking" of the thumbnail-type stacked graphic representations of electronic document publications in FIG. 3 with the selected issue being centrally located.

FIG. 4A illustrates the cursor 30 selecting publication "H" Vol. X−1, and either of the above alternative display options may continue in like fashion to display either the cover page of the next previous electronic document publication issue 22b, or to unstack the thumbnail-type stacked graphic representations of the electronic document publications as shown in FIG. 4B.

Figure 5:
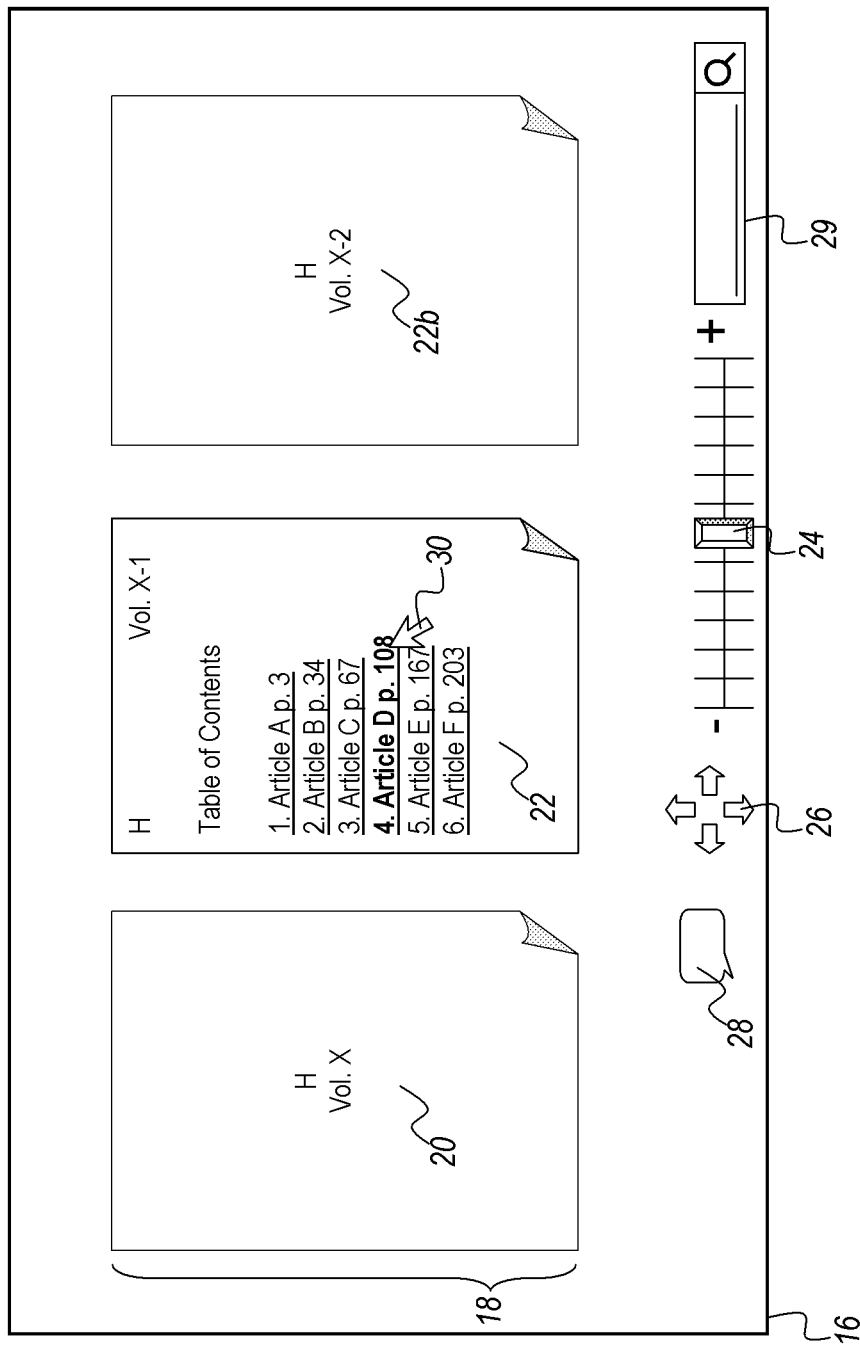
FIG. 5 illustrates an exemplary embodiment of the system that displays published electronic documents further illustrating the detailed zooming function to display information from a table of contents, according to an exemplary aspect of the present invention.

FIG. 4B illustrates the cursor 30 selecting the "folded" corner portion of the previous electronic document publication 22. This selection by the user input device 2, further zooms, i.e., displays more detailed information with respect to the selected previous electronic document publication 22. For example, FIG. 5 displays the Table of Contents page of the previous electronic document publication 22, wherein a user via the user input device 2 may select a specific topic or article from the Table of Contents. FIG. 5 illustrates the user input device 2 controlling cursor 30 to select the fourth listing on the Table of Contents, "Article D p. 108."

Figure 6:
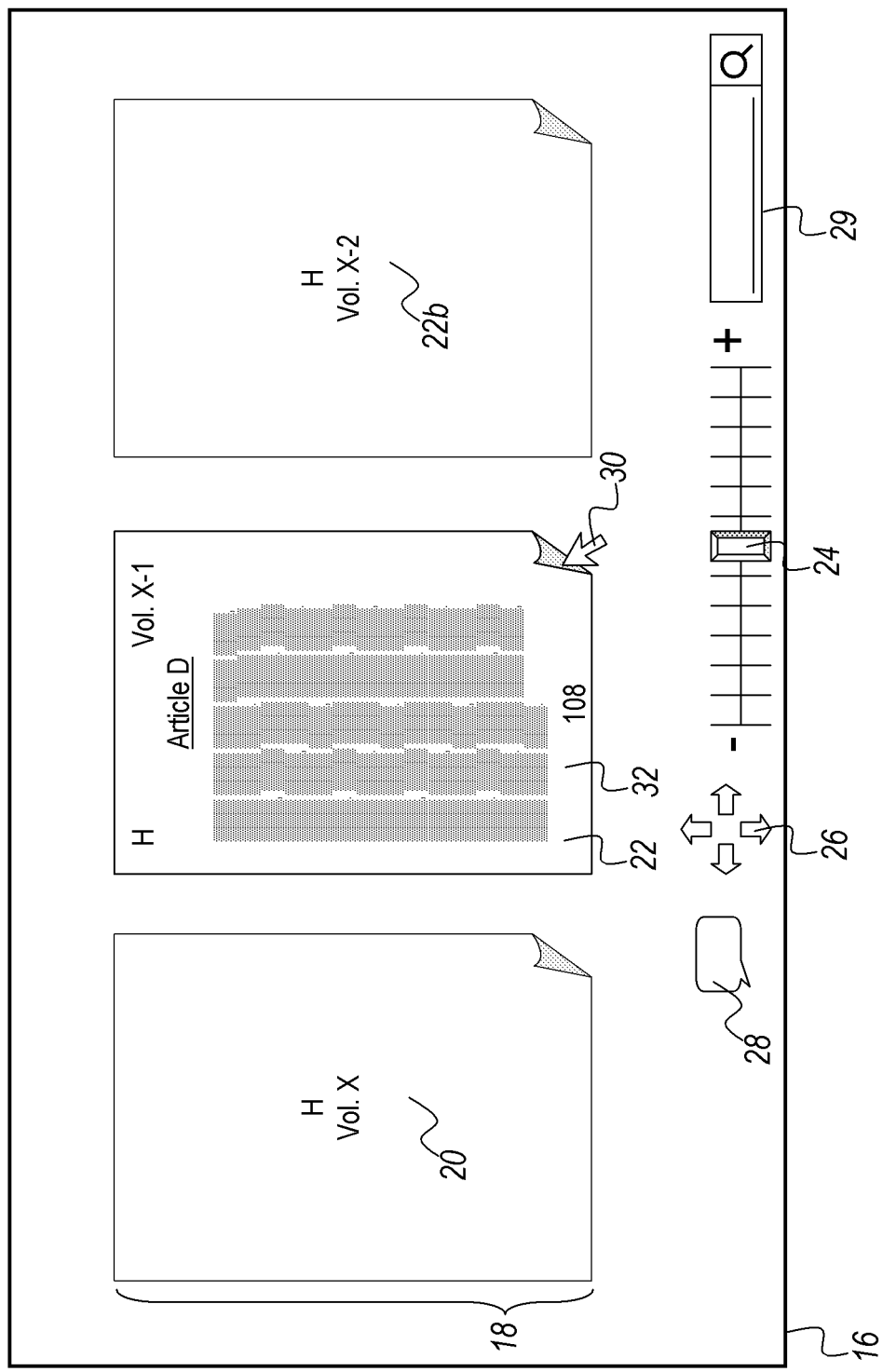
FIG. 6 illustrates an exemplary embodiment of the system that displays published electronic documents further illustrating a further detailed zooming function to display content of a publication, according to an exemplary aspect of the present invention.

Based on the user's selection of the article from the Table of Contents, FIG. 6 displays the first page 32 of the selected article. FIG. 6 illustrates the cursor 30 selecting the "folded" corner portion of the first page of the selected article 32 to display subsequent pages of the selected article 32.

Figure 7:
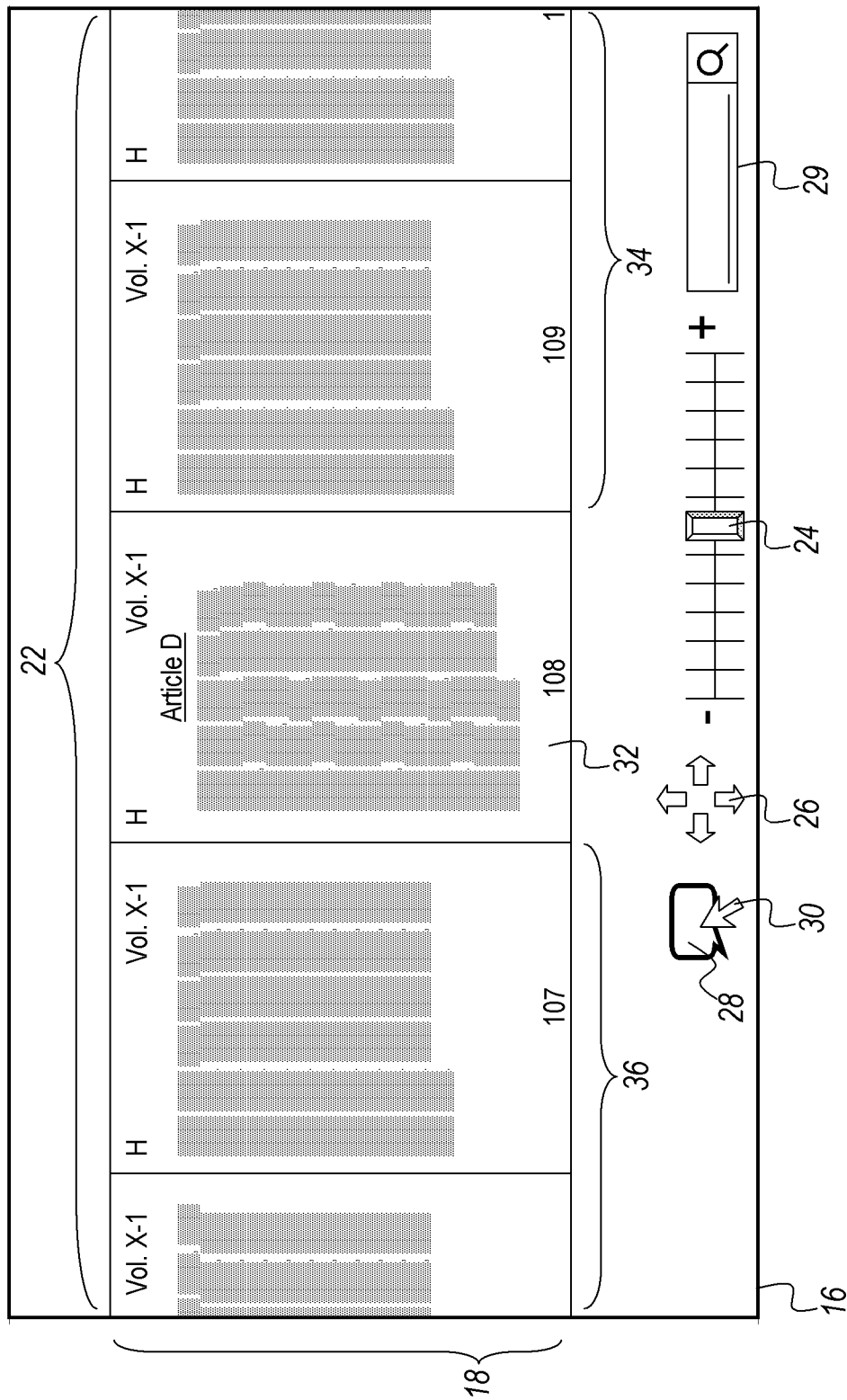
FIG. 7 illustrates an exemplary embodiment of the system that displays published electronic documents further illustrating an alternate display of content of a publication, according to an exemplary aspect of the present invention.

FIG. 7 illustrates the outcome of displaying subsequent pages of the selected article 32 such that previous pages 36 before the selected article 32 are displayed to the left of the first page of the article 32, and subsequent pages 34 of the selected article 32 are displayed to the right of the first page of the article 32. These contiguous displayed pages may be in a horizontal display, (as shown), or a vertical display configuration, and may be manipulated by the user input device 2 with the zoom 24 and pan 26 control functions as previously described.

An additional feature of the present invention is the ability of a user via the user input device 2, to enter comments and/or rating information to an electronic document publication, a specific issue of electronic document publication, and/or a specific location with an electronic document publication by a tag insertion function, as shown in the graphical substrate 16 by the selected icon 28. The tag insertion control function 28 may include an API executed within the graphical substrate 16 and controlled by the electronic periodical display controller 8.

The user may use the user input device 2 to select an electronic document publication, a specific issue of an electronic document publication, or a specific location within an electronic document publication to insert a text message or a rating indication. A rating indication may include a graphical representation of a scale that indicates a user's opinion as to the relevance, quality, helpfulness or any other quality associated with an electronic document publication. This feature of the present invention may be selected by the user input device 2 represented by the cursor 30 in FIG. 7 selecting the tag insertion control function 28 that opens a dialog box, (not shown), to enter text or a rating and prompt the user to indicate on what electronic document publication, or at what location on the electronic document publication should the user entered text or rating tag be attached.

Figure 8A:
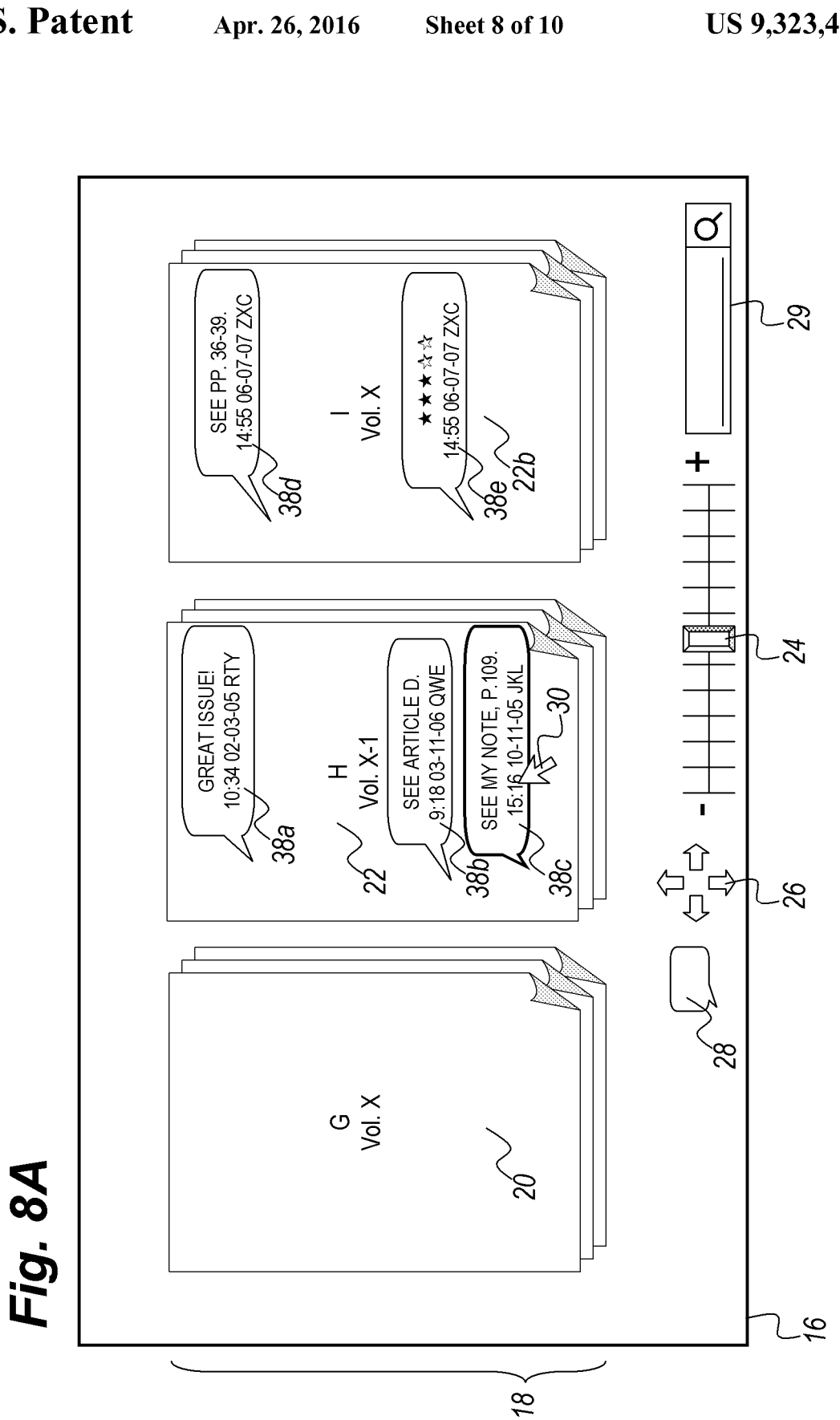
FIG. 8A illustrates an exemplary embodiment of the system that displays published electronic documents having a user tagging function applied to electronic periodical, according to an exemplary aspect of the present invention.
Figure 8B:
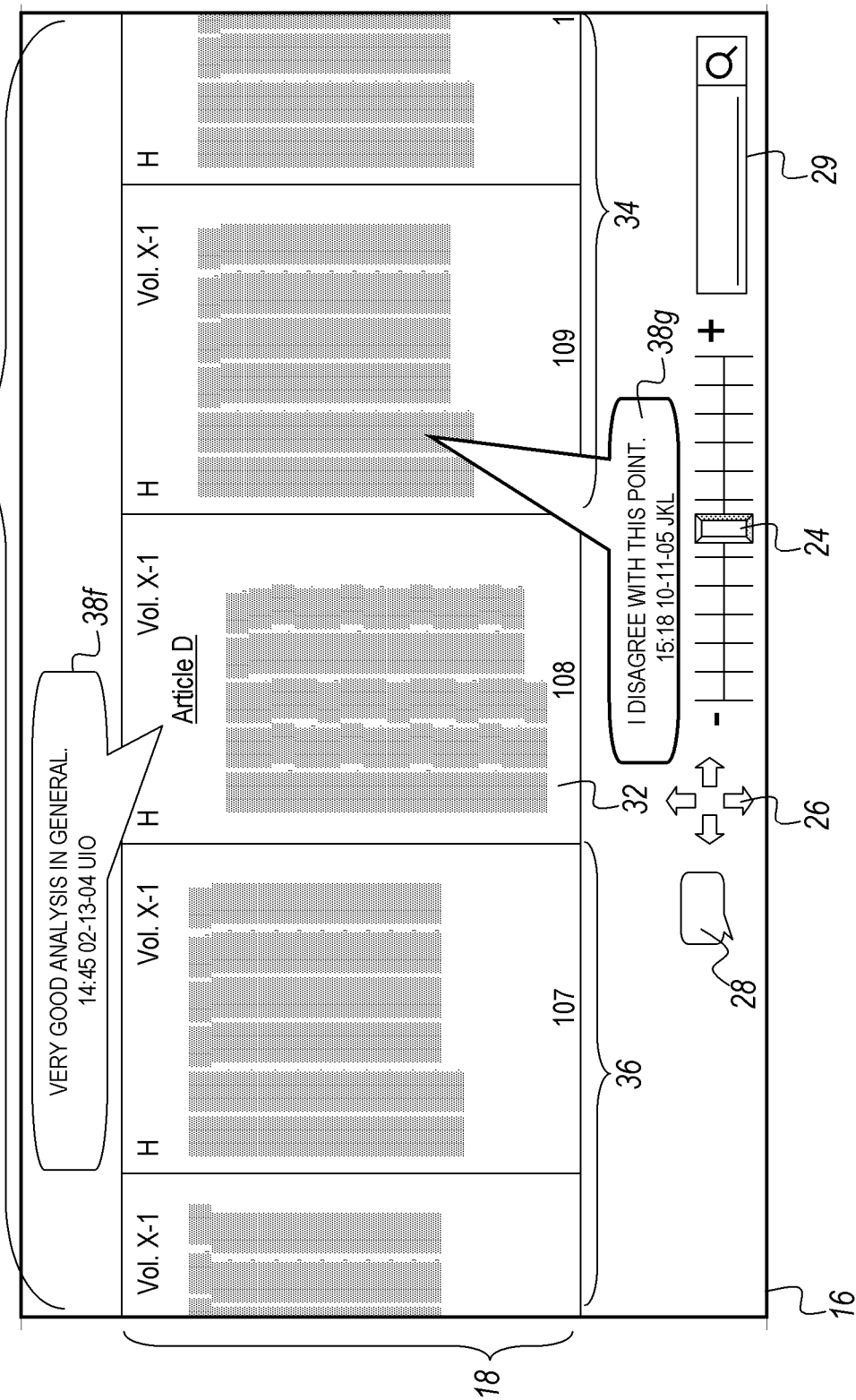
FIG. 8B illustrates an exemplary embodiment of the system that displays published electronic documents having a user tagging function alternately applied to specific contents of the electronic periodical, according to an exemplary aspect of the present invention.

FIG. 8A illustrates a number of the user-entered tags 38a-38e. Annotation-style text tags 38a-38c are located on previous electronic periodical 22, and 38d on next previous electronic periodical 22b. Each of these text tags may include comments by the user, the time and date the comments were entered, and an indication of the identity of the author of the tag, for example the initials, user attached audio and video files, and user attached documents. Rating-style tag 38e located on next previous electronic periodical 22b indicates a three of a five star rating and the time and date the rating was entered and an indication of the identity of the author of the rating. Each of these tags may be further linked to additional tags or specific locations within the electronic document publication. For example, user input device 2 illustrates a control of cursor 30 selecting tag 38c in FIG. 8A. FIG. 8B illustrates the display on the graphical substrate 16 of a linked tag 38g referenced by the selected tag 38c. FIG. 8B additionally illustrates the capacity of user input tags to be associated with a specific article, for example, tag 38f associated with "Article D," and a specific location within an article, for example, tag 38g.

As with the content of electronic document publications, the content of the user input tags and ratings may be searched by the search field function 29 on the basis of the content of the tag, the time and date of the tag, the author of the tag, a specific electronic document publication or specific issue of an electronic document publication, the format type of tag (e.g., audio or video), location of the tag within a particular section of an electronic document, and the location of the tag within a particular section of on a page in an electronic document.

Additionally, user input tags may be designated by their author as a public tag, viewable by all users, or may be designated as a private tag, to be viewed by a particular person or group of users for security or privacy purposes. The user input tags may be attached a particular electronic document publication, the particular issue of an electronic document publication, at the beginning of an article of electronic document publication, on a specific section of an article, on a specific paragraph of an article, or at a specific location and the text or graphic display content of an article.

Figure 9:
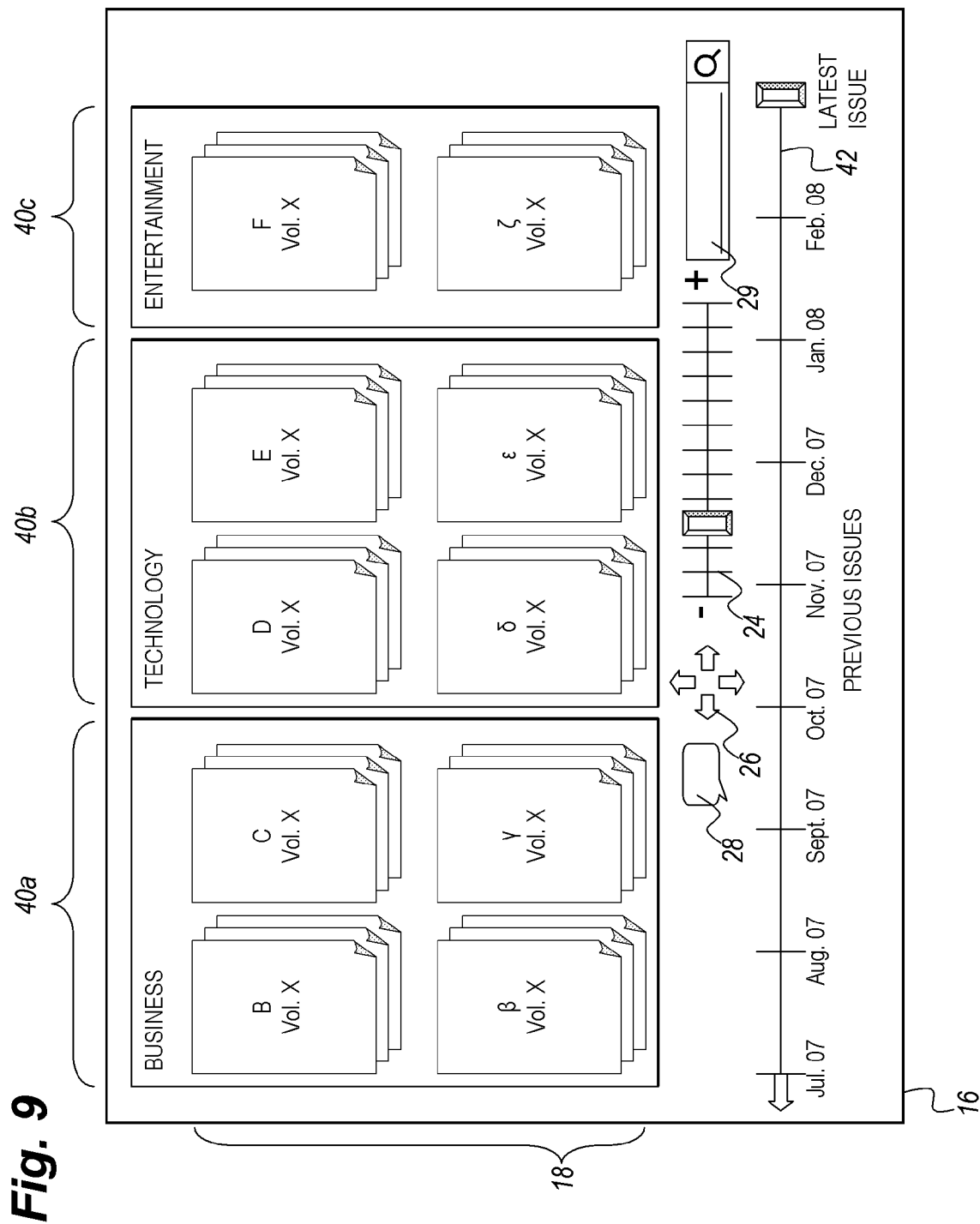
FIG. 9 illustrates an exemplary embodiment of the system that displays published electronic documents having a category arrangement feature for the electronic documents and a previous issue date selecting function, according to an exemplary aspect of the present invention.

FIG. 9 illustrates that the electronic periodical display controller 8 may arrange the displayed electronic document publications 18 on the graphical substrate 16 in a predetermined arrangement scheme. For example, business documents 40a, technology documents 40b, and entertainment documents 40c may be grouped together based on the general topical content of the electronic document publications. Another example may include arranging particular electronic document publications in a manner associated with a particular retail store arrangement scheme. Another example may include arranging particular electronic document publications to which a user has a paid subscription. Additionally, a user may create their own arrangement by dragging specific electronic documents within various organizational sections. Each of these above arrangements may be displayed automatically without any user input based on a predefined arrangement scheme or a general topical arrangement as controlled by the electronic periodical display controller 8, or electronic documents may be arranged upon the direction of the user via the user input device 2.

This arrangement feature may also be used when a user enters text into the search field 29 and the system retrieves a number of electronic documents based on the input text query so that the electronic periodical display controller 8 arranges all of the retrieved electronic documents into groups based on any of the above criteria, and may also display the exact page location of the queried text in each retrieved electronic document publication.

Additionally, electronic periodical display controller 8 may arrange the electronic documents retrieved from a text query based upon the topic of the articles retrieved within an electronic document publication rather than the general category of the electronic document publication itself. For example, if a search query was entered with respect to the apparel industry in Hong Kong, electronic periodical display controller 8 may also arrange electronic document publications having additional related topics with respect to the apparel industry in other Asian Pacific nations, other non-apparel industries within Hong Kong, or the apparel industry in China generally.

FIG. 9 additionally illustrates a periodical issue selector 42 that enables a user to select a particular issue periodical month or date to be displayed for each electronic document publication displayed within the graphical substrate 16.

In a similar manner as described above, the zooming function control 24 and panning function control 26 may be operated by the user input device 2 to manipulate the display of electronic document publications in each of these predetermined arrangement-type display schemes.

With its unique and novel features, the present invention provides a method and system for requesting help which may eliminate the need for a help-desk person, and may, therefore, provide significant cost savings to an organization.

While the invention has been described in terms of one or more exemplary embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A system for displaying published electronic documents, said system comprising:
    an electronic document database that stores electronic files representing a plurality of electronic documents;
    an electronic document display controller that displays, based on topical contents of said plurality of electronic documents, a graphic substrate upon which said plurality of electronic documents retrieved from said electronic document database is arranged;
    a user input controller that receives user input to manipulate said graphic substrate to control a zooming function and a panning function that displays said plurality of electronic documents within said graphic substrate, and associates input user information with a specific one of said plurality of electronic documents, said input user information comprising annotations for a shared use of different users to be displayed on said graphic substrate upon which the plurality of electronic documents is arranged, said annotations comprising annotations of said different users displayed on said graphic substrate;
    a scalable tiled graphic composite document rendering unit provided in said graphic substrate that displays information output from said electronic document display controller corresponding to said plurality of electronic documents based on a value of said zooming function and a value of said panning function; and
    a periodical selector that is configured to enable one of the users to select a particular issue periodical date to be displayed on said graphic substrate for each of said plurality of electronic documents displayed within the graphical substrate,
    wherein the electronic document display controller is configured to arrange all of said plurality of electronic documents retrieved from said electronic document database into groups based on predetermined criteria such that, in each of said groups, a page location of a query text inputted by said one of the users is displayed in each of said plurality of electronic documents retrieved from said electronic document database.

2. The system according to claim 1, wherein said arranged electronic documents displayed within said graphic substrate are arranged by at least one from the group comprising:
    a general topic of each of said electronic documents;
    user subscription information to a periodical;
    a user's organization; and
    a predetermined arrangement configuration.

3. The system according to claim 1, wherein said electronic-documents comprise electronic files of at least one from the group comprising:
    digitized image files;
    digital document files;
    animated graphic files;
    application program files;
    audio files;
    video files; and
    composite multimedia files.

4. The system according to claim 1, wherein said user input controller receives a user selection function applied to a specific issue of a plurality of corresponding published issues of said plurality of electronic documents that causes a display of additional information of said specific issue.

5. The system according claim 4, wherein said display of additional information includes at least one from the group comprising:
    displaying a higher resolution document rendering of said specific issue;
    displaying a table of contents of said specific issue; and
    displaying previously un-displayed content of said specific issue.

6. The system according to claim 1, wherein said user input controller receives a user selection function applied to an electronic document that causes a display of a previously un-displayed corresponding electronic document.

7. The system according to claim 1, further comprising:
    a user input database that saves said input user information from the user input controller associated with said specific one of said plurality of electronic documents, and displays on said graphic substrate said stored input user information within said graphic substrate associated with said specific one of said plurality of electronic documents.

8. The system according claim 7, wherein said display of additionally information includes at least one from the group comprising:
    displaying a higher resolution document rendering of said corresponding published issue;
    displaying a table of contents of said corresponding published issue; and
    displaying previously un-displayed content of said corresponding published issue.

9. The system according to claim 1, wherein said panning function applied to said graphic substrate causes a display of additional electronic documents previously un-displayed in said graphic substrate.

10. The system according to claim 1, wherein said zooming function applied to said graphic substrate one of displays one of additional electronic documents previously un-displayed in said graphic substrate, and removes from displaying some of said plurality of electronic documents previously displayed in said graphic substrate.

11. The system according to claim 1, wherein said user information includes one from the group comprising:
    a date and time indicator;
    a text message;
    an indication of an originating author;
    an indication of one of a reviewer and a reviewer text message;
    a rating indication;
    an authorized reviewing group designation;
    an audio file;

a video file; and
an electronic document file.

12. The system according to claim 11, wherein said user information is displayed within said graphic substrate and associated with said specific one of said plurality of electronic documents.

13. The system according to claim 12, wherein said user information is displayed within said graphic substrate and associated with one of a specific location and a specific feature within said specific one of said plurality of electronic documents.

14. The system according to claim 12, wherein said user information is displayed based on said authorized reviewing group designation that limits the display of said user information to non-designated users.

15. The system according to claim 1, further comprising:
a document selection function that responds to said user input by displaying in said graphic substrate all of said plurality of electronic documents corresponding to a same user selected time period.

16. The system according to claim 1, wherein said electronic document database, said electronic document display controller, and said user input database are remotely disposed from a location where a user inputs said user input.

17. The system according to claim 1, wherein said annotations of said different users are simultaneously displayed on said graphic substrate, and
wherein said annotations of said different users are displayed on the plurality of electronic documents in said graphic substrate.

18. The system according to claim 1, wherein said annotations of said different users are displayed on said specific one of the plurality of electronic documents in said graphic substrate, and
wherein said annotations of said different users are simultaneously displayed on a same screen of said graphic substrate.

19. A system for displaying published electronic documents, said system comprising:
an electronic document display controller that displays a graphic substrate upon which a plurality of electronic documents is arranged;
a user input controller that receives user input to manipulate said graphic substrate to control a zooming function and a panning function that displays, based on topical contents of said plurality of electronic documents, said plurality of electronic documents within said graphic substrate, and associates input user information with a specific one of said plurality of electronic documents, said input user information comprising annotations for a shared use of different users to be displayed on said graphic substrate upon which the plurality of electronic documents is arranged, said annotations comprising annotations of said different users displayed on said graphic substrate;
a scalable tiled graphic composite document rendering unit provided in said graphic substrate that displays information output from said electronic document display controller corresponding to said plurality of electronic documents based on a value of said zooming function and a value of said panning function; and
a periodical selector that is configured to enable one of the users to select a particular issue periodical date to be displayed on said graphic substrate for each of said plurality of electronic documents displayed within the graphical substrate,
wherein the electronic document display controller is configured to arrange all of said plurality of electronic documents retrieved from an electronic document database into groups based on predetermined criteria such that, in each of said groups, a page location of a query text inputted by said one of the users is displayed in each of said plurality of electronic documents retrieved from said electronic document database.

20. The system according to claim 19, further comprising:
an electronic document database that stores electronic files representing said plurality of electronic documents.

21. The system according to claim 19, further comprising:
a user input database that saves said input user information from the user input controller associated with said specific one of said plurality of electronic documents, and displays on said graphic substrate said stored input user information within said graphic substrate associated with said specific one of said plurality of electronic documents.

22. A method of displaying published electronic documents, said method comprising:
displaying a scalable graphic tiled graphic substrate, based on topical contents of said plurality of electronic documents, upon which a plurality of electronic documents is arranged;
controlling said graphic substrate to manipulate said display of said plurality of electronic documents by a zooming function, a panning function and a selection function;
inputting user information to be associated with a specific one of said plurality of electronic documents, said user information comprising annotations for a shared use of different users, said annotations comprising annotations of said different users displayed on said graphic substrate;
displaying said stored user information within said graphic substrate associated with said specific one of said plurality of electronic documents on said graphic substrate upon which the plurality of electronic documents is arranged;
displaying a composite document rendering that displays information regarding said plurality of electronic documents corresponding to a value of said zooming function and a value of said panning function; and
enabling one of the users to select a particular issue periodical date to be displayed on said graphic substrate for each of said plurality of electronic documents displayed within the graphical substrate,
wherein said displaying the scalable graphic tiled graphic substrate includes arranging all of said plurality of electronic documents retrieved from an electronic document database into groups based on predetermined criteria such that, in each of said groups, a page location of a query text inputted by said one of the users is displayed in each of said plurality of electronic documents retrieved from said electronic document database.

23. The method of displaying according to claim 22, further comprising:
storing said user information in a user input database.

24. The method of displaying according to claim 22, further comprising:
receiving user input from a remotely disposed location used for said controlling said graphic substrate to manipulate said display of said plurality of electronic documents.

25. A non-transitory programmable storage medium embodying, a program of machine-readable instructions executable by a digital processing apparatus to perform operations supporting a method of displaying published electronic documents, the operations comprising:

displaying a scalable tiled graphic substrate, based on topical contents of said plurality of electronic documents, upon which a plurality of electronic documents is arranged;

controlling said graphic substrate to manipulate said display of said plurality of electronic documents by a zooming function, a panning function and a selection function;

receiving input to manipulate said graphic substrate display of said plurality of electronic documents by a zooming function, a panning function and a selection function;

inputting user information to be associated with a specific one of said plurality of electronic documents, said user information comprising annotations for a shared use of different users, said annotations comprising annotations of said different users displayed on said graphic substrate;

storing said user information in a user input database;

displaying said stored user information within said graphic substrate associated with said specific one of said plurality of electronic documents on said graphic substrate upon which the plurality of electronic documents is arranged;

displaying a composite document rendering within said graphic substrate that displays information regarding said plurality of electronic documents corresponding to a value of said zooming function and a value of said panning function; and enabling one of the users to select a particular issue periodical date to be displayed on said graphic substrate for each of said plurality of electronic documents displayed within the graphical substrate, wherein said displaying the scalable graphic tiled graphic substrate includes arranging all of said plurality of electronic documents retrieved from an electronic document database into groups based on predetermined criteria such that, in each of said groups, a page location of a query text inputted by said one of the users is displayed in each of said plurality of electronic documents retrieved from said electronic document database.

* * * * *